United States Patent
Gilder et al.

(10) Patent No.: US 8,725,799 B2
(45) Date of Patent: May 13, 2014

(54) SERVER-SIDE TIMING ESTIMATION OF CLIENT-SIDE ACTIONS

(75) Inventors: Ariel Ephraim Gilder, New York, NY (US); Elliot Schwartz, San Francisco, CA (US)

(73) Assignee: Google Inc., Mountain View, CA (US)

( * ) Notice: Subject to any disclaimer, the term of this patent is extended or adjusted under 35 U.S.C. 154(b) by 48 days.

(21) Appl. No.: 13/529,458

(22) Filed: Jun. 21, 2012

(65) Prior Publication Data
US 2013/0346473 A1 Dec. 26, 2013

(51) Int. Cl.
*G06F 15/16* (2006.01)

(52) U.S. Cl.
USPC ............................. 709/203; 709/204; 709/205

(58) Field of Classification Search
None
See application file for complete search history.

(56) References Cited

U.S. PATENT DOCUMENTS

| | | | |
|---|---|---|---|
| 7,130,268 B2 * | 10/2006 | Mascolo | 370/232 |
| 7,444,418 B2 * | 10/2008 | Chou et al. | 709/231 |
| 2003/0018796 A1 * | 1/2003 | Chou et al. | 709/231 |
| 2006/0182034 A1 * | 8/2006 | Klinker et al. | 370/238 |
| 2007/0140128 A1 * | 6/2007 | Klinker et al. | 370/238 |
| 2011/0161959 A1 | 6/2011 | Sharon et al. | |
| 2011/0231333 A1 | 9/2011 | Chen | |
| 2012/0110109 A1 | 5/2012 | Luna et al. | |

FOREIGN PATENT DOCUMENTS

JP 2002-335256 A 11/2002

* cited by examiner

*Primary Examiner* — Umar Cheema
(74) *Attorney, Agent, or Firm* — McDermott Will & Emery LLP (57) ABSTRACT

A computer implemented method of adjusting for varying delays in communication of a batch of actions uploaded for processing from a client application to a server application. The method includes receiving the batch of actions to be processed, the batch of actions including the actions, action time stamps, and an upload time stamp, generating a receipt time stamp for receipt of the batch, estimating times of occurrences of actions in the batch based on a base time and the action time stamps, and adjusting a process running on a server based on the estimated times. The base time is estimated by estimating when a first action in the batch occurred and, if a time between two adjacent actions in the batch exceeds a predefined limit, the base time is re-estimated by estimating when a second of the two adjacent actions occurred.

24 Claims, 5 Drawing Sheets

SERVER-SIDE TIMING ESTIMATION OF CLIENT-SIDE ACTIONS

BACKGROUND

The present disclosure generally relates to estimating timings of client-side actions.

Certain types of application clients that run on mobile devices batch some actions together for upload to an application server over a wireless network. The application server can then process the batch of actions and return results to the mobile device or responds in some other fashion.

Knowing when the actions took place or originated at the mobile device can be useful, for example to measure or to tune performance of application servers or the wireless network. However, while the application servers may know when a batch of actions arrived, the server may not know when the actions were actually generated by or requested on the mobile device.

For example, even if the application client on the mobile device places time stamps on the batched actions, time frames for the application client and the application server may be misaligned. Thus, client-side time measurements may not accurately correlate to server-side times.

SUMMARY

According to one aspect of the present disclosure, a computer implemented method is provided that adjusts for varying delays in communication of a batch of actions uploaded for processing from a client application running on a mobile device to at least one server application running on one or more servers. The method includes receiving the batch of actions to be processed, the batch of actions including at least the actions, action time stamps generated by the client application for the actions, and an upload time stamp generated by the client application for uploading the batch, generating a receipt time stamp for receipt of the batch, estimating times of occurrences of actions in the batch based on a base time and the action time stamps, and adjusting at least one process running on one or more of the servers based on one or more of the estimated times. The base time is first estimated by estimating when a first action in the batch occurred based on at least an action time stamp for the first action in the batch, the upload time stamp, and the receipt time stamp. In a case that a time between two adjacent actions in the batch exceeds a predefined limit, the base time is re-estimated by estimating when a second of the two adjacent actions occurred based on at least an action time stamp for the second of the two adjacent actions, the upload time stamp, and the receipt time stamp.

According to another aspect of the disclosure, a system is provided for adjusting for varying delays in communication of a batch of actions uploaded for processing from a client application running on a mobile device to at least one server application running on the system. The system includes a memory device and processing hardware. The processing hardware is configured to receive, from the memory device, the batch of actions to be processed, the batch of actions including at least the actions, action time stamps generated by the client application for the actions, and an upload time stamp generated by the client application for uploading the batch, generate a receipt time stamp for receipt of the batch, estimate a base time by estimating when a first action in the batch occurred based on at least an action time stamp for the first action in the batch, the upload time stamp, and the receipt time stamps, estimate times of occurrences of actions in the batch based on the base time and the action time stamps. The processing hardware is further configured to re-estimate, in a case that a time between two adjacent actions in the batch exceeds a predefined limit, the base time by estimating when a second of the two adjacent actions occurred based on at least an action time stamp for the second of the two adjacent actions, the upload time stamp, and the receipt time stamp, adjust the times of occurrences of the actions in the batch that occurred after the two adjacent actions using the re-estimated base time, and adjust at least one process running on the system based on one or more of the estimated times.

According to a further aspect of the disclosure, a machine-readable storage medium includes machine-readable instructions for causing a processor to execute a method for adjusting for varying delays in communication of a batch of actions uploaded for processing from a client application running on a mobile device to at least one server application running on one or more servers. The method includes the steps of receiving the batch of actions to be processed, the batch of actions including at least the actions, action time stamps generated by the client application for the actions, and an upload time stamp generated by the client application for uploading the batch, generating a receipt time stamp for receipt of the batch, estimating times of user initiations of actions in the batch based on a base time and the action time stamps, and adjusting at least one process running on one or more of the servers based on one or more of the estimated times. The base time is first estimated by estimating when a first action in the batch occurred based on at least an action time stamp for the first action in the batch, the upload time stamp, and the receipt time stamp. In a case that a time between two adjacent actions in the batch exceeds a predefined limit, the base time is re-estimated by estimating when a second of the two adjacent actions occurred based on at least an action time stamp for the second of the two adjacent actions, the upload time stamp, and the receipt time stamp.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Although some examples provided herein describe a user's information (e.g., user actions performed using a mobile device) being stored in memory, the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). The user information does not include and/or share the specific identification of the user (e.g., the user's name) unless otherwise specifically provided or directed by the user.

Certain types of application clients that run on mobile devices batch some actions together for upload to a server over a wireless network. An application server running on the server can then process the batch of actions and return results to the mobile device or respond in some other fashion.

Knowing when the actions took place or originated at the mobile device can be useful, for example to measure or to tune performance of application servers or the wireless network. However, while the application servers may know when a batch of actions arrived, the server may not know when the actions were actually generated by or requested on the mobile device.

For one example, a map program running on a user's mobile device can capture most of a user's search-based actions over a 24 hour period. Time stamps reported by a mobile device for certain actions such as retrieving search details, getting directions, and the like may not accurately reflect when a user initiated the actions. Theses actions may be preserved with correct ordering, but may not have accurate time stamps in terms of the server's time frame. Time frames for the application client and the application server may be misaligned. Thus, client-side time measurements may not accurately correlate to server-side times.

A misalignment between mobile device and server time frames can change to due clock drift in the mobile device, sometimes significantly. In addition, the misalignment can change significantly if the batch of actions is redirected to a different server than a previous batch or is sent using a different path to the same server as a previous batch. These changes can occur even within a single batch of actions. The misalignment also can be impacted by motion of the mobile device, for example by causing these changes.

The change in misalignment has the potential to be exacerbated if a time between actions is too long. One possible reason is that drifts in misalignment can accumulate between actions.

The changing misalignment can result in varying delays in communication of a batch of actions uploaded for processing from a client application running on a mobile device to at least one server application running on one or more servers. One aspect of the techniques discussed herein includes estimating server-side times for batched client-side actions. The server-side times can then be used to measure and possibly adjust for the changing misalignment.

The actions in this context can be initiated using a client application running on a mobile device. The server-side times can be estimated based on at least time stamps generated by the client application for the actions, a time stamp generated by the client application for uploading a batch of the actions, and a time stamp generated by the application server for receiving the batch of actions. Estimation of the server-side times can also incorporate server-side time estimates for reference events uploaded apart from the batch of actions.

Figure 1:
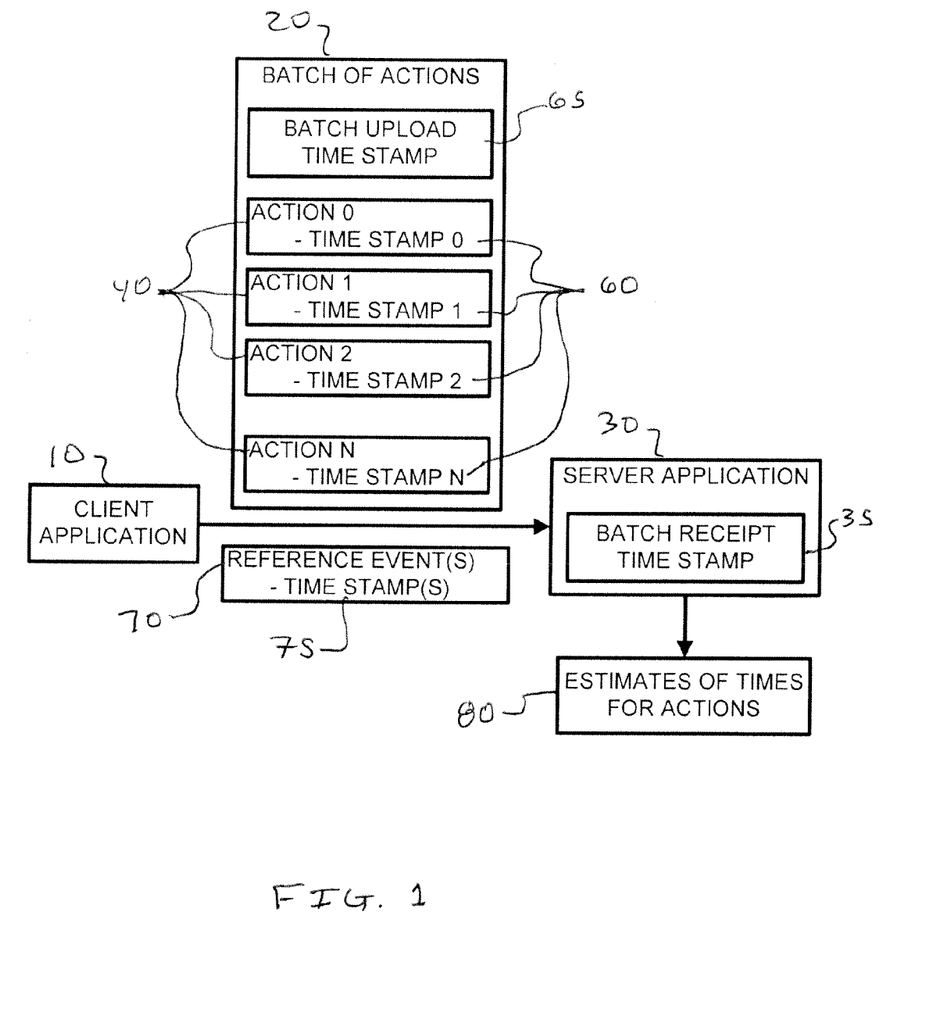
FIG. 1 is a block diagram illustrating a client application sending a batch of actions to a server application according to certain aspects of the disclosure.

FIG. 1 is a block diagram illustrating a client application sending a batch of actions to a server application according to certain aspects of the disclosure. In this figure, client application 10 is shown sending batch of actions 20 to server application 30. Client application 10 can be running on a mobile device, and server application 30 can be running on one or more servers.

Batch of actions 20 includes several actions 40 numbered 0 to N. Examples of actions that can be included in batch 20 include but are not limited to search actions performed on a map program. Each action can include an action time stamp 60 generated by or for client application 10. As discussed above, these time stamps can be misaligned with respect to server application 30's time frame, and this misalignment can drift.

Batch of actions 20 can also include its own time stamp, here batch upload time stamp 65. This time stamp can indicate when the client application uploaded the batch of action. Batch receipt time stamp 35 can indicate when the server application received the batch of actions.

Client application 10 is also shown sending reference events 70 apart from batch of actions 20. According to certain aspects of this disclosure, reference time stamps 75 for these reference events can be trusted if the application server 30 responds to the events individually. For example, in the mobile device context, examples of such reference events can include but are not limited to actual search requests such as local searches, place page requests, directions requests, and the like. Other types of events and time stamps also can server as references.

According to certain techniques discussed herein, server application 30 or some other program running on a server or some other computing device can use batch receipt time stamp 35, action time stamps 60, batch upload time stamp 65, and reference time stamps 75 to generate estimates 80 for actions 40 in terms of application server 30's time frame.

Figure 2:
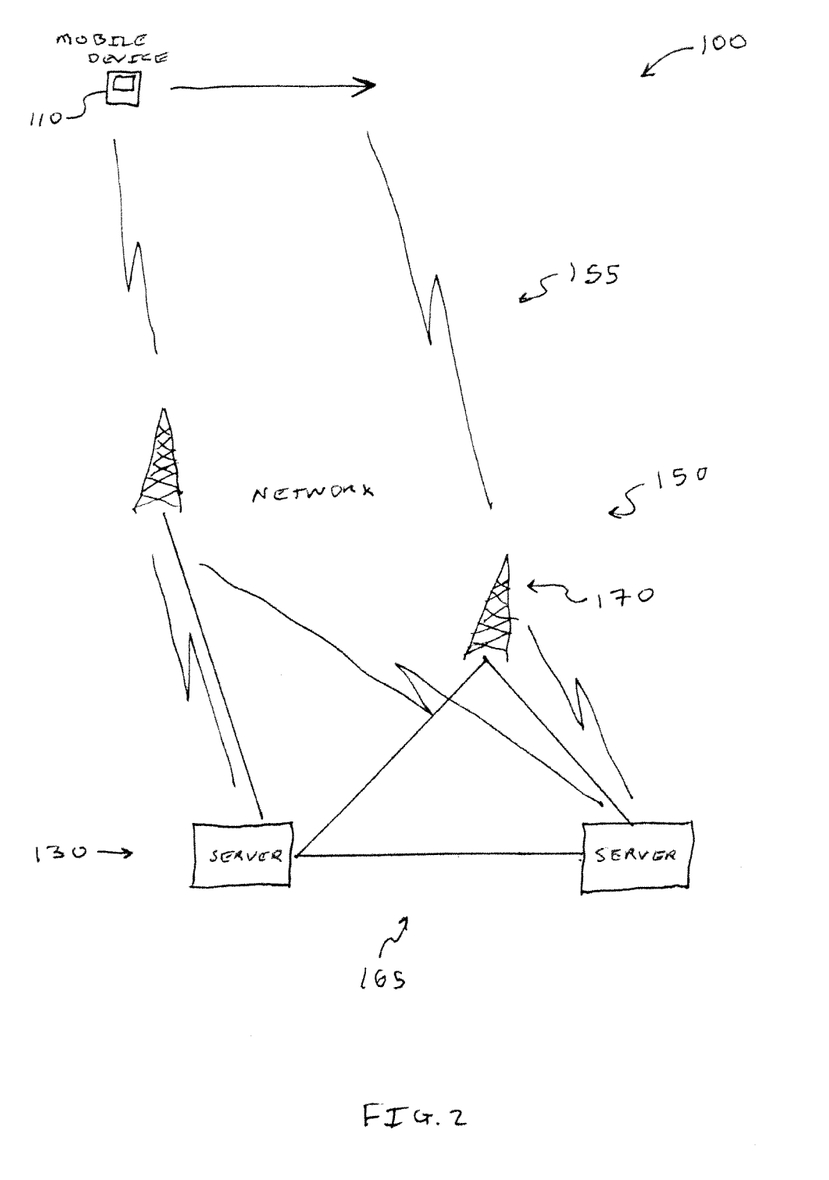
FIG. 2 illustrates an example of an architecture in which a mobile device can connect to one or more servers over a wireless network according to certain aspects of the disclosure.

FIG. 2 illustrates an example of an architecture in which a mobile device can connect to one or more servers over a wireless network according to certain aspects of the disclosure. This figure also illustrates some of the issues discussed above with respect to FIG. 1.

Architecture 100 includes mobile device 110 and servers 130 connected over network 150. One of the servers 130, servers 130 communicating over network 150, or some other computing device or system can be configured to estimate and adjust for varying communication delays according to certain aspects of the disclosure. For purposes of load balancing, multiple servers, mobile devices, other computing devices, or some combination thereof can be configured to do so.

The mobile device 110 and servers 130 can be any computing devices having processing hardware, memory, and communications capability that can be used to perform some or all of the techniques disclosed herein. Such computing devices can be, for example, desktop computers, mobile computers, tablet computers (e.g., including e-book readers), mobile devices (e.g., a smartphones or personal digital assistants), set top boxes (e.g., for a television), video game consoles, or any other computing devices.

At least a portion of network 150 can include a wireless network 155 over which mobile device 110 can communicate with servers 130. Wireless network 155 is represented by jagged lines in FIG. 2. This communication can also occur partially over wired or land-line network 165 represented by straight lines in FIG. 2. In addition, relay devices such as communication towers 170 can participate in the communication between mobile device 110 and servers 130.

Servers 130 can communicate with each other using any part of network 150. The network can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more network topologies such as a bus network, a star network, a ring network, a mesh network, a star-bus network, tree or hierarchical network, and the like.

The variety of communication pathways through network 150 can result in batches of actions and even actions within a batch taking different times to travel from mobile device 110 to one or more servers 130. Motion of mobile device 110, represented by an arrow in FIG. 2, can result in different batches and actions traveling over different pathways as well.

Figure 3:
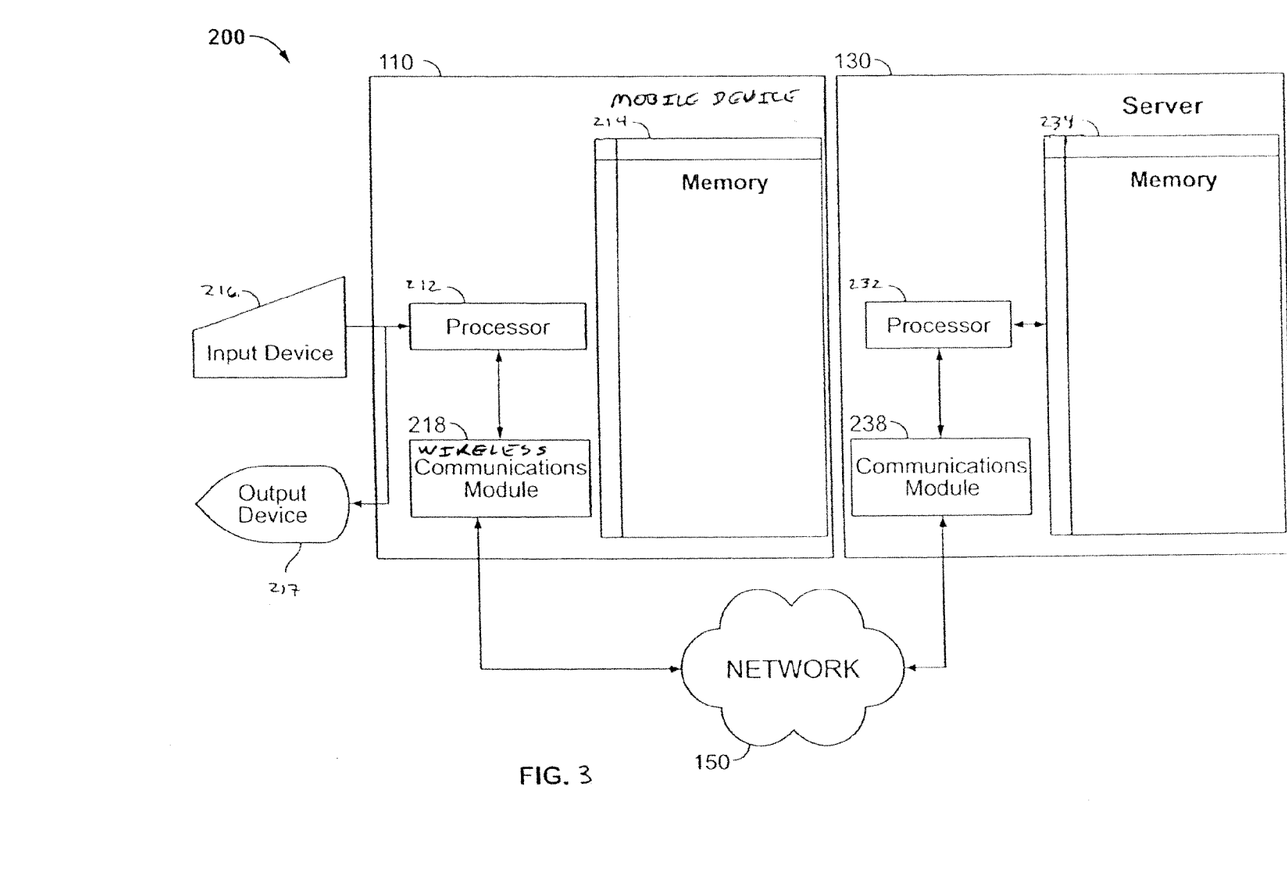
FIG. 3 is a block diagram illustrating an example of a client and a server from the architecture of FIG. 2 according to certain aspects of the disclosure.

FIG. 3 is a block diagram illustrating an example of a client and a server from the architecture of FIG. 2 according to certain aspects of the disclosure.

Mobile device 110 and server 130 are connected over network 150 via respective communications modules. Mobile device 110's wireless communication module 218 includes a wireless transmitter and receiver for communication over a wireless portion of network 150. Mobile device 110 may be capable of other forms of communication as well.

Server 130's communication module 238 may be capable of wireless communication, wired communication, optical communication, or any combination of thereof. For example, server 130's communication module can be an Ethernet card over which server 130 communicates with mobile device 110 through an intermediary. For another example, server 130's communication module can be an optical card that communicates over fiber options. Server 130 may be capable of other forms of communication as well.

Both communication modules 218 and 238 can be configured to interface with the network 150 to send and receive information, such as data, batches of actions, reference events, other requests, responses, and commands to other devices on the network.

Mobile device 110 and server 130 preferably include processors and some form of memory. In FIG. 3, mobile device 110 includes processor 212 and memory 214, and server 130 includes processor 232 and memory 234. Memory 212 and 234 can be volatile or non-volatile memory. Mobile device 110 also preferably includes input device 216 and output device 217 for accepting input from and providing output to a user.

Figure 4:
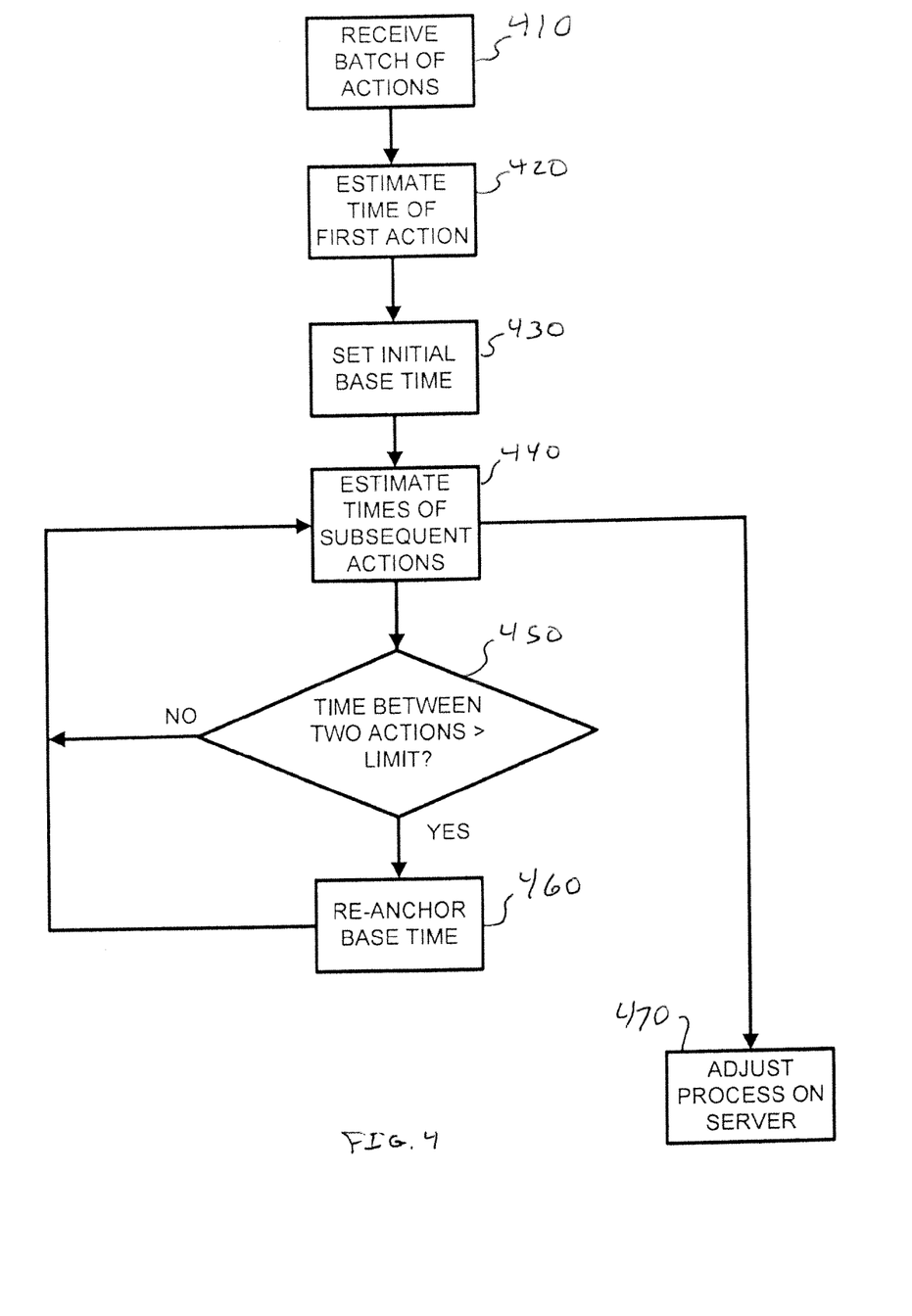
FIG. 4 is a flowchart illustrating a possible technique of adjusting for varying delays in communication of a batch of actions from a mobile device to a server according to certain aspects of the disclosure.
Figure 5:
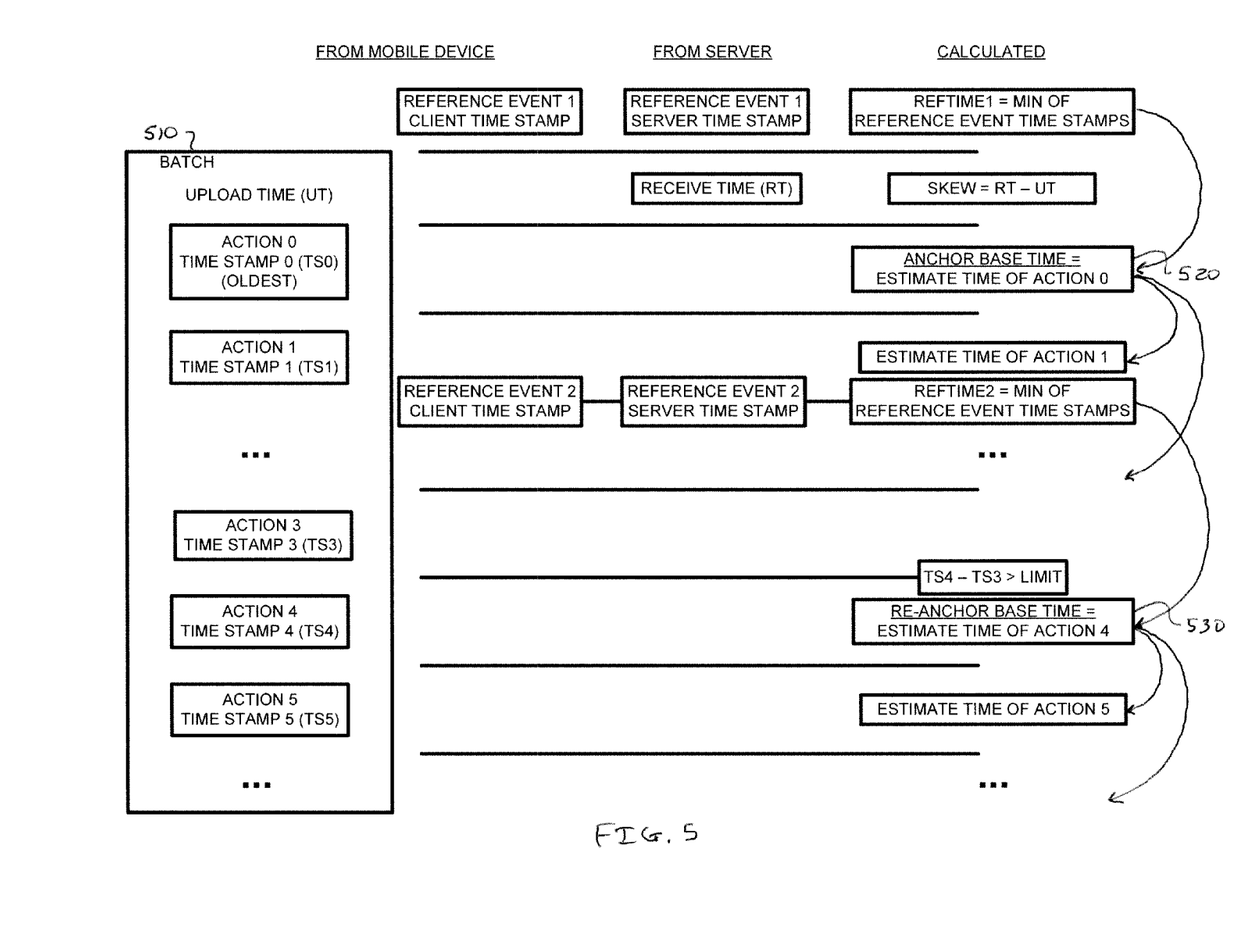
FIG. 5 illustrates various time stamps, events, and calculations that can be used by the technique shown in FIG. 4 according to certain aspects of the disclosure.

One aspect of the subject technology adjusts for varying delays in communication of a batch of actions uploaded for processing from a client application running on a mobile device such as mobile device 110 to at least one server application running on one or more servers such as server 130. According to this aspect, a method for doing so includes receiving the batch of actions to be processed, the batch of actions including at least the actions, action time stamps generated by the client application for the actions, and an upload time stamp generated by the client application for uploading the batch, generating a receipt time stamp for receipt of the batch, estimating times of occurrences of actions in the batch based on a base time and the action time stamps, and adjusting at least one process running on one or more of the servers based on one or more of the estimated times. FIG. 4 is a flowchart illustrating a possible technique for performing this aspect of the disclosure, and FIG. 5 illustrates various time stamps, events, and calculations that can be used by some implementations of the technique shown in FIG. 4.

In a step 410, batch of actions 510 is received from a mobile device for processing. The batch can be received by a server or some other computing device. For the sake of clarity, this system will be referred to as a server in the remaining discussion of FIGS. 4 and 5, but the steps can be implemented by other computing devices as well.

The batch includes at least the actions, time stamps for the actions, and an upload time stamp for the batch. The action time stamps are designated as TS0, TS1, etc. in FIG. 5, and the upload time stamp is designated as UT in FIG. 5. These time stamps can be generated by the mobile device. Upon receipt of the batch, the server generates a receipt time stamp. This time stamp is designated as RT in FIG. 5.

In step 420, a time of the first action in the batch is estimated in terms of the server's time frame. This time is also set as a base time in step 430 for estimating times of subsequent actions.

The base time is estimated based on at least an action time stamp for the first action in the batch, the upload time stamp, and the receipt time stamp. In one technique, the base time is estimated using TS0, a skew value, and a reference time. The skew value is a different between the upload time UT and the receipt time RT. This value represents a misalignment between the mobile device's clock and the server's clock. A reference time is determined by taking a minimum value of mobile device and server time stamps for a reference event that is not part of the batch of actions. Thus, FIG. 5 shows REFTIME1 equal to a minimum of a client time stamp and a server time stamp for reference event 1. This figure also shows "anchoring" 520 of a base time. In one aspect, the base time can be calculated using TS0, the skew value, and REFTIME1.

Time of subsequent actions in the batch are estimated in step 440. For example, FIG. 5 shows a time estimate for action 1. Ellipses (" . . . ") represent subsequent actions and time estimations. In one aspect, the times of the subsequent actions can be estimated using the base time, the skew, and a delta between the time stamps for the actions and the time stamp for the first action (TS0). For example, the time for action 1 in FIG. 5 can be estimated as the base time plus (or minus) the skew plus the delta between TS0 and TS1.

Numerous different approaches can be used to make the necessary calculations. In one approach, deltas are aggregated into a total delta value. In another approach, the base time is updated between actions with deltas between each action.

If time stamps for two subsequent action are separated by more than a predetermined limit, for example 60 or 120 seconds, then misalignment between client time and server time may have had enough time to aggregate or drift, possibly throwing off the calculations. In this case, step 450 redirects flow so that a new base time can be calculated in step 460. In one approach, this base time can be calculated from a time stamp for the later of those action time stamps, the skew value, and a new reference time. The new reference time can be determined by taking a minimum value of mobile device and server time stamps for a more recent reference event that is not part of the batch of actions. Thus, FIG. 5 shows "re-anchoring" 530 of the base time using TS4, the skew value, and REFTIME2 after a difference between TS3 and TS4 exceeds a limit.

In an alternative approach, times for all actions in the batch can be calculated using the first base time, and then times for actions that occur after the time limit between actions is exceeded can be recalculated. The recalculation can be performed by determining the new base time, subtracting the old base time from those estimates, and adding the new base time. One possible benefit of this approach is that multiple times can be estimated for some actions, and statistical techniques can be applied to those times to determine a compromise value, choose a best value, or glean other information from the values.

Flow returns to step 440 for estimating of times of subsequent actions. After the base time has been re-anchored, these times can be estimated based on the time stamp for the action when re-anchoring occurred. For example, FIG. 5 shows a time estimate for action 1. Ellipses (" . . . ") represent subsequent actions and time estimations. In one aspect, the times of the subsequent actions can be estimated using the re-anchored base time, the skew, and a delta between the time stamps for the actions and the time stamp for the action that triggered re-anchoring of the base time. For example, the time for action 5 in FIG. 5 can be estimated as the re-anchored base time plus (or minus) the skew plus the delta between TS5 and TS4.

The relationships described above between reference times, base times, and estimated times are illustrated by curved arrows in FIG. 5.

After times have been estimated for the actions in a batch, these estimated times can be used to adjust at least one process running on the server or some other device or devices. This step is shown as step 470 in FIG. 4. In one example, the adjustment is performed after times for all of the actions in the batch have been estimated. In another example, the adjustment is performed concurrently with iterations of the estimating steps.

The foregoing disclosure includes a description of techniques implemented using a server in communication with a mobile device. The techniques also can be implemented using other computing devices. These techniques further can be implemented as a computer implemented method, as instructions stored on machine-readable storage medium or computer readable medium, and in other forms.

Furthermore, various aspects of the subject matter described in this disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this disclosure, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like.

The computing device can be a client, a server, or both a client and a server (i.e., self-serving). A client and server are generally but not necessarily remote from each other and can interact through a communication network. The relationship of client and server arises by virtue of computer programs running on the respective computers and having a client-server relationship to each other. A computing device used to implement the disclosed techniques can be, for example, and without limitation, a desktop computer, laptop computer, or tablet computer. The computing device can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to a medium or media that can store data and instructions for execution by processing hardware. Such a medium may take many forms, including, but not limited to, non-volatile media and volatile media. Non-volatile media include, for example, optical or magnetic disks. Volatile media include dynamic memory.

Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described in this disclosure can be implemented as instructions stored by such machine-readable storage media, computer readable media, or other storage or memory.

While this disclosure contains many specifics, these should not be construed as limitations on the scope of what may be claimed, but rather as descriptions of particular implementations of the subject matter. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this disclosure has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer implemented method of adjusting for varying delays in communication of a batch of actions uploaded for processing from a client application running on a mobile device to at least one server application running on one or more servers, comprising:

receiving the batch of actions to be processed, the batch of actions including at least the actions, action time stamps generated by the client application for the actions, and an upload time stamp generated by the client application for uploading the batch;

generating a receipt time stamp for receipt of the batch;

estimating times of occurrences of actions in the batch based on a base time and the action time stamps; and adjusting at least one process running on one or more of the servers based on one or more of the estimated times;

wherein the base time is first estimated by estimating when a first action in the batch occurred based on at least an action time stamp for the first action in the batch, the upload time stamp, and the receipt time stamp, and in a case that a time between two adjacent actions in the batch exceeds a predefined limit, the base time is re-estimated by estimating when a second of the two adjacent actions occurred based on at least an action time stamp for the second of the two adjacent actions, the upload time stamp, and the receipt time stamp.

2. The method of claim 1, wherein the steps are performed by the at least one application server.

3. The method of claim 1, wherein estimating when a first action in the batch occurred is further based on a reference time corresponding to a reference event uploaded apart from the batch.

4. The method of claim 3, with the reference event having occurred before the first action in the batch.

5. The method of claim 3, wherein the reference time comprises a minimum value of time stamps by generated by the client application and the server application for the reference event.

6. The method of claim 3, wherein estimating when a second of the two adjacent actions occurred is further based on a second reference time corresponding to a second reference event uploaded apart from the batch, with the second reference event having occurred after the reference event.

7. The method of claim 6, with the second reference event having occurred between the first action in the batch and the second of the two adjacent actions.

8. The method of claim 6, wherein the second reference time comprises a minimum value of time stamps by generated by the client application and the server application for the second reference event.

9. A system for adjusting for varying delays in communication of a batch of actions uploaded for processing from a client application running on a mobile device to at least one server application running on the system, the system comprising:

a memory device; and processing hardware configured to receive, from the memory device, the batch of actions to be processed, the batch of actions including at least the actions, action time stamps generated by the client application for the actions, and an upload time stamp generated by the client application for uploading the batch;

generate a receipt time stamp for receipt of the batch;

estimate a base time by estimating when a first action in the batch occurred based on at least an action time stamp for the first action in the batch, the upload time stamp, and the receipt time stamps;

estimate times of occurrences of actions in the batch based on the base time and the action time stamps;

re-estimate, in a case that a time between two adjacent actions in the batch exceeds a predefined limit, the base time by estimating when a second of the two adjacent actions occurred based on at least an action time stamp for the second of the two adjacent actions, the upload time stamp, and the receipt time stamp;

adjust the times of occurrences of the actions in the batch that occurred after the two adjacent actions using the re-estimated base time; and adjust at least one process running on the system based on one or more of the estimated times.

10. The system of claim 9, wherein the processing hardware is further configured to adjust at least one process running on at least one other system based on one or more of the estimated times.

11. The system of claim 9, wherein estimating when a first action in the batch occurred is further based on a reference time corresponding to a reference event uploaded apart from the batch.

12. The system of claim 11, with the reference event having occurred before the first action in the batch.

13. The system of claim 11, wherein the reference time comprises a minimum value of time stamps by generated by the client application and the server application for the reference event.

14. The system of claim 11, wherein estimating when a second of the two adjacent actions occurred is further based on a second reference time corresponding to a second reference event uploaded apart from the batch, with the second reference event having occurred after the reference event.

15. The system of claim 14, with the second reference event having occurred between the first action in the batch and the second of the two adjacent actions.

16. The system of claim 14, wherein the second reference time comprises a minimum value of time stamps by generated by the client application and the server application for the second reference event.

17. A non-transitory machine-readable storage medium comprising machine-readable instructions for causing a processor to execute a method for adjusting for varying delays in communication of a batch of actions uploaded for processing from a client application running on a mobile device to at least one server application running on one or more servers, the method comprising:

receiving the batch of actions to be processed, the batch of actions including at least the actions, action time stamps generated by the client application for the actions, and an upload time stamp generated by the client application for uploading the batch;

generating a receipt time stamp for receipt of the batch;

estimating times of user initiations of actions in the batch based on a base time and the action time stamps; and adjusting at least one process running on one or more of the servers based on one or more of the estimated times;

wherein the base time is first estimated by estimating when a first action in the batch occurred based on at least an action time stamp for the first action in the batch, the upload time stamp, and the receipt time stamp, and in a case that a time between two adjacent actions in the batch exceeds a predefined limit, the base time is re-estimated by estimating when a second of the two adjacent actions occurred based on at least an action time stamp for the second of the two adjacent actions, the upload time stamp, and the receipt time stamp.

18. The non-transitory machine-readable storage medium of claim 17, wherein the steps are performed by the at least one application server.

19. The non-transitory machine-readable storage medium of claim 17, wherein estimating when a first action in the batch occurred is further based on a reference time corresponding to a reference event uploaded apart from the batch.

20. The non-transitory machine-readable storage medium of claim 19, with the reference event having occurred before the first action in the batch.

21. The non-transitory machine-readable storage medium of claim 19, wherein the reference time comprises a minimum value of time stamps by generated by the client application and the server application for the reference event.

22. The non-transitory machine-readable storage medium of claim 19, wherein estimating when a second of the two adjacent actions occurred is further based on a second reference time corresponding to a second reference event uploaded apart from the batch, with the second reference event having occurred after the reference event.

23. The non-transitory machine-readable storage medium of claim 22, with the second reference event having occurred between the first action in the batch and the second of the two adjacent actions.

24. The non-transitory machine-readable storage medium of claim 22, wherein the second reference time comprises a minimum value of time stamps by generated by the client application and the server application for the second reference event.

* * * * *